(12) United States Patent
Sherlekar et al.

(10) Patent No.: US 12,248,744 B2
(45) Date of Patent: Mar. 11, 2025

(54) POLY-BIT CELLS

(71) Applicant: Synopsys, Inc., Mountain View, CA (US)

(72) Inventors: Deepak Dattatraya Sherlekar, Cupertino, CA (US); Shanie George, Mountain View, CA (US); Shi Chen, San Jose, CA (US); Vahe Harutyunyan, Yerevan (AM)

(73) Assignee: Synopsys, Inc., Sunnyvale, CA (US)

( * ) Notice: Subject to any disclaimer, the term of this patent is extended or adjusted under 35 U.S.C. 154(b) by 616 days.

(21) Appl. No.: 17/456,963

(22) Filed: Nov. 30, 2021

(65) Prior Publication Data

US 2022/0171912 A1   Jun. 2, 2022

Related U.S. Application Data

(60) Provisional application No. 63/119,489, filed on Nov. 30, 2020.

(51) Int. Cl.
*G06F 30/392* (2020.01)
*G06F 30/3953* (2020.01)
*G06F 111/20* (2020.01)

(52) U.S. Cl.
CPC ........ *G06F 30/392* (2020.01); *G06F 30/3953* (2020.01); *G06F 2111/20* (2020.01)

(58) Field of Classification Search
CPC . G06F 30/392; G06F 30/3953; G06F 2111/20
USPC ....................................................... 716/120
See application file for complete search history.

(56) References Cited

U.S. PATENT DOCUMENTS

| 6,223,330 B1* | 4/2001 | Risler ................. G06F 30/327 |
| | | 716/135 |
| 9,779,197 B1* | 10/2017 | Wagner .............. H01L 27/0207 |
| 10,650,112 B1* | 5/2020 | Krishnamurthy ...... H03K 3/037 |
| 11,275,886 B2* | 3/2022 | Chen ..................... G06F 30/396 |
| 11,847,396 B1* | 12/2023 | Jain ....................... G06F 30/327 |
| 2009/0083691 A1 | 3/2009 | Penzes |
| 2015/0227646 A1* | 8/2015 | Arunachalam ....... G06F 30/392 |
| | | 716/104 |
| 2017/0141211 A1 | 5/2017 | Xie et al. |
| 2018/0107779 A1* | 4/2018 | Zepter .................. G06F 30/337 |
| 2018/0365368 A1 | 12/2018 | Do et al. |

(Continued)

OTHER PUBLICATIONS

International Preliminary Report on Patentability, International Application No. PCT/US2021/061132, dated Jun. 15, 2023 consists of 8 pages.

(Continued)

*Primary Examiner* — Jack Chiang
*Assistant Examiner* — Suchin Parihar
(74) *Attorney, Agent, or Firm* — Patterson + Sheridan, LLP

(57) ABSTRACT

Poly-bit cells and methods for forming the same are provided. In one example, a method for forming a poly-bit cell includes identifying layouts in a library of single-bit cells having one or more of a different functionality and a different drive that are combinable; storing, in memory, layouts that are combinable; and creating layouts of poly-bit cells from the stored combinable single-bit cells. Each poly-bit cell combined from layouts of at least two single-bit cells has one or more of a different functionality and a different drive.

20 Claims, 10 Drawing Sheets

(56) References Cited

U.S. PATENT DOCUMENTS

2020/0099368 A1\* 3/2020 Wang .................. G06F 1/04
2021/0256193 A1\* 8/2021 Chen .................. G06F 30/337

OTHER PUBLICATIONS

Cherif, et al. "A New Multi-Bit Flip-Flop Merging Mechanism for Power Consumption Reduction in the Physical Implementation Stage of ICs Conception" Journal of Low Power Electronics and Applications Sep. 3, 2019.
International Search Report and Written Opinion, International Application No. PCT/US2021/061132, dated Feb. 25, 2022 consists of 13 pages.

\* cited by examiner

POLY-BIT CELLS

CROSS-REFERENCES TO RELATED APPLICATIONS

The present disclosure claims priority to U.S. Provisional Patent Application 63/119,489 filed Nov. 30, 2020, entitled "POLY-BIT CELLS", which is incorporated herein by reference in its entirety.

TECHNICAL FIELD

The present disclosure relates to the field of electronics in general, including cell-based design. More particularly, the present disclosure relates to a system and method for providing poly-bit cells.

BACKGROUND

In a semiconductor process, compaction of layout may be achieved by implementing multiple independent or interconnected functions in a single, integrated layout, instead of a collection of independent, interconnected cells. Such compaction is commonly done in custom circuit design and layout, making a custom designed layout much denser than one created using standard cells as building blocks. Recent advances in cell-based design employ multi-bit cells, which integrate multiple identical independent cells into a single cell to save area. The area savings come from better layout compaction and sometimes from sharing devices. Individual bits in these cells have similar performance as conventional independent, single bit cells, but in a smaller area. For example, by sharing a diffusion break between individual bits, a multi-bit cell including the two bits can provide area savings of approximately 25% compared to the areas of two single-bit cells.

During the chip implementation flow, compatible single-bit cells can be mapped to a multi-bit cell, reducing design area. Cells are compatible if their functions match, are placed (or are likely to be placed) in close proximity and have similar performance needs. The compatibility requirement reduces the number of cells which can be mapped to multi-bit cells. The proportion of cells which get mapped to multi-bit is moderately high for heavily used cells, but not for infrequently used cells. Accordingly, the situations in which multi-bit cells can be substituted for can be fewer in number than designers would otherwise desire.

SUMMARY

Poly-bit cells and methods for forming the same are provided. In one example, a method for forming a poly-bit cell includes identifying layouts in a library of single-bit cells having at least one or more of a different functionality and a different drive that are combinable; storing, in memory, layouts that are combinable; and creating layouts of poly-bit cells from the stored combinable single-bit cells. Each poly-bit cell combined from layouts of at least two single-bit cells has one or more of a different functionality and a different drive.

In another example, a poly-bit cell is provided that includes a power connection, a ground connection, a first function, and a second function. The first function is connected between the power connection and the ground connection. The first function has a first driving power and a first operation. The second function is connected between the power connection and the ground connection. The second function has a second driving power and a second operation. The second function is different than the first function in driving power or operation, or both driving power and operation.

In yet another example, a method is provided that includes identifying a first single-bit cell that includes a first function of a first drive strength; identifying a second single-bit cell that includes a second function of a second drive strength; and replacing the first single-bit cell and the second single-bit cell in a circuit layout with a poly-bit cell that includes the first function set at the first drive strength and the second function set at the second drive strength.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
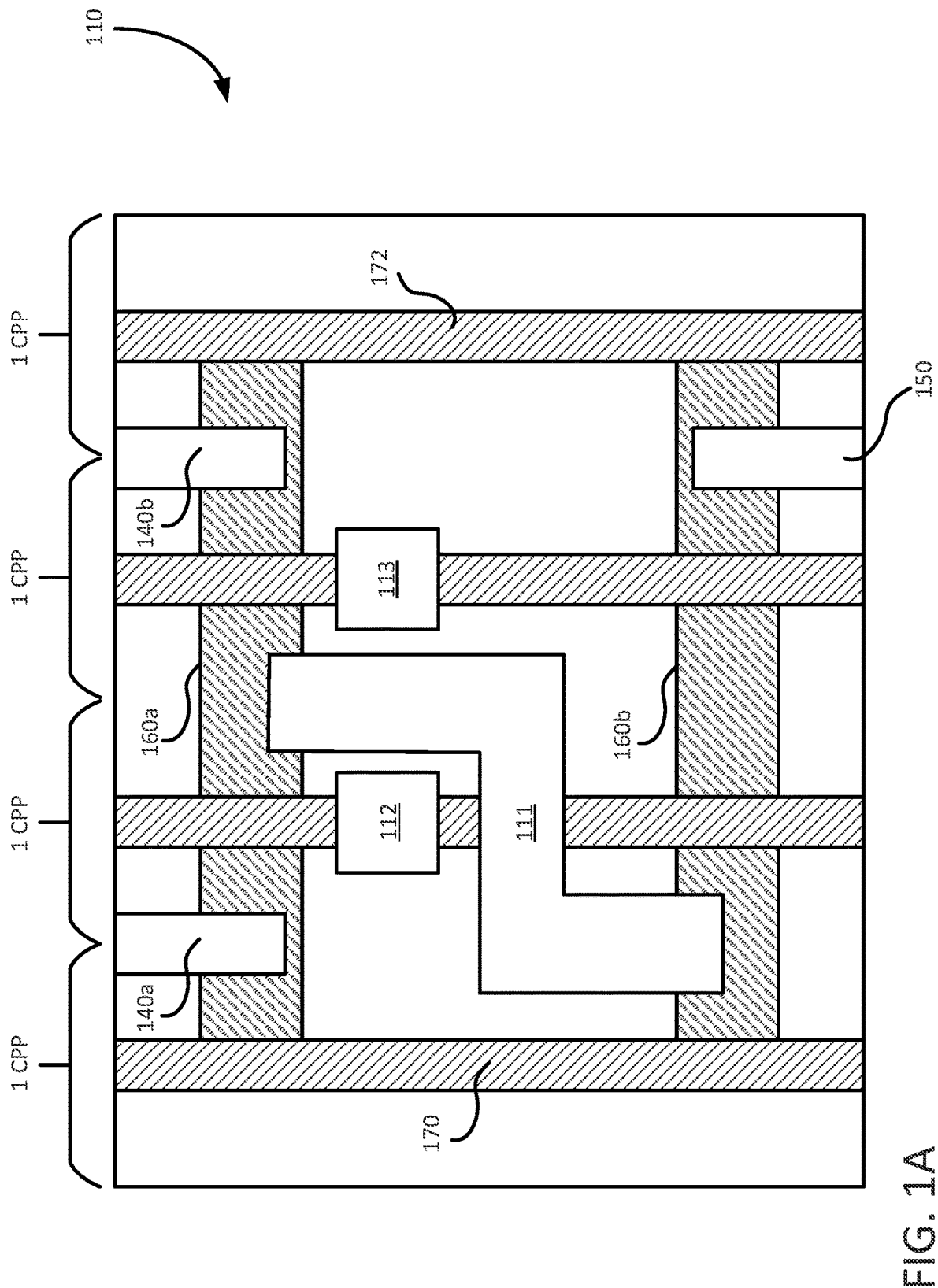
FIGS. 1A, 1B, and 1C illustrate single-bit cells as may be merged into a poly-bit cell, according to embodiments of the present disclosure.

Embodiments of the present disclosure relate to the construction and implementation of poly-bit cells (also referred to as PB cells). In a PB cell, two discrete single-bit cells are combined into one cell to share a ground and a power connection. The functionality, the drive strength, and combinations thereof of the two single-bit cells combined in a PB cell may be different or the same. Functionality is the function and or operation implemented by a cell. In some embodiments, functionality may additionally or alternatively be characterized by the size of an integrated circuit structure, such as an active device, for example, a transistor and the like. For example, one transistor may be sized differently to meet a desired criteria relative another transistor even if the transistors both implement the same function. Some examples in which transistors may be sized differently include cells optimized to minimize the average of the rise and fall delays; cells optimized to improve the rise delay by reducing the size of either the P or the N transistor but not both; cells optimized to minimize the fall delay in the same manner; multi-input cells optimized to speed up a designated arc but not all arcs; cells optimized to balance the rise and fall delays; and multi-stage cell families where the ratio of drives between successive stages of the cells is different; among others. Drive is the electrical drive of the output stage of the cell. Accordingly, for cell layouts employing single diffusion breaks or continuous diffusion mechanisms to isolate diffusions in the cell with diffusion in adjacent cells, the width of the combined cell will be one grid smaller, while in double diffusion break layouts, the width can be reduced by two grids.

The ability to select single-bit cells for combination into a PB cell independently of whether the two single-bit cells share the same function and drive strength offers a greater range of potential cells to combine than typical multi-bit cells. Beneficially, the savings in area can be applied to a greater number of cells in a design layout, thus saving a greater amount of area in the design, allowing for smaller and more power-efficient circuit designs. PB cells can be implemented to combine two single-bit cells that have operations and/or drive strengths that are independent of one another. Stated differently, the PB cells can combine cells that use equivalent or different operations (e.g., inverter (OR), NAND, NOR, XNOR, XOR, AND, ANDOR, ORAND, multiplex (MUX), and buffer) at equivalent or different drive strengths relative to one another. These PB cells offer similar benefits in area savings as multi-bit cells, but offer increases in the number of types of compatible cells which can be combined to accrue the benefit at an order of magnitude greater than multi-bit cells.

FIGS. 1A, 1B, 1C, 2A, 2B, 2C, and 2D illustrate double diffusion break layouts of various cells, according to embodiments of the present disclosure. Although FIGS. 1A, 1B, 1C, 2A, 2B, 2C, and 2D provide examples with a NAND function with an output 111, a 1× drive inverter function with an output 131, and a 2× drive inverter function with an output 121, one of ordinary skill in the art will recognize that the present examples are not limiting, and that the present disclosure can be applied to a plethora of different functions combined into a PB-cell from corresponding individual cells with various different outputs, which may be accessible outside of the poly-bit cells, connected for internal use within the poly-bit cells, and combinations thereof.

Figure 1B:
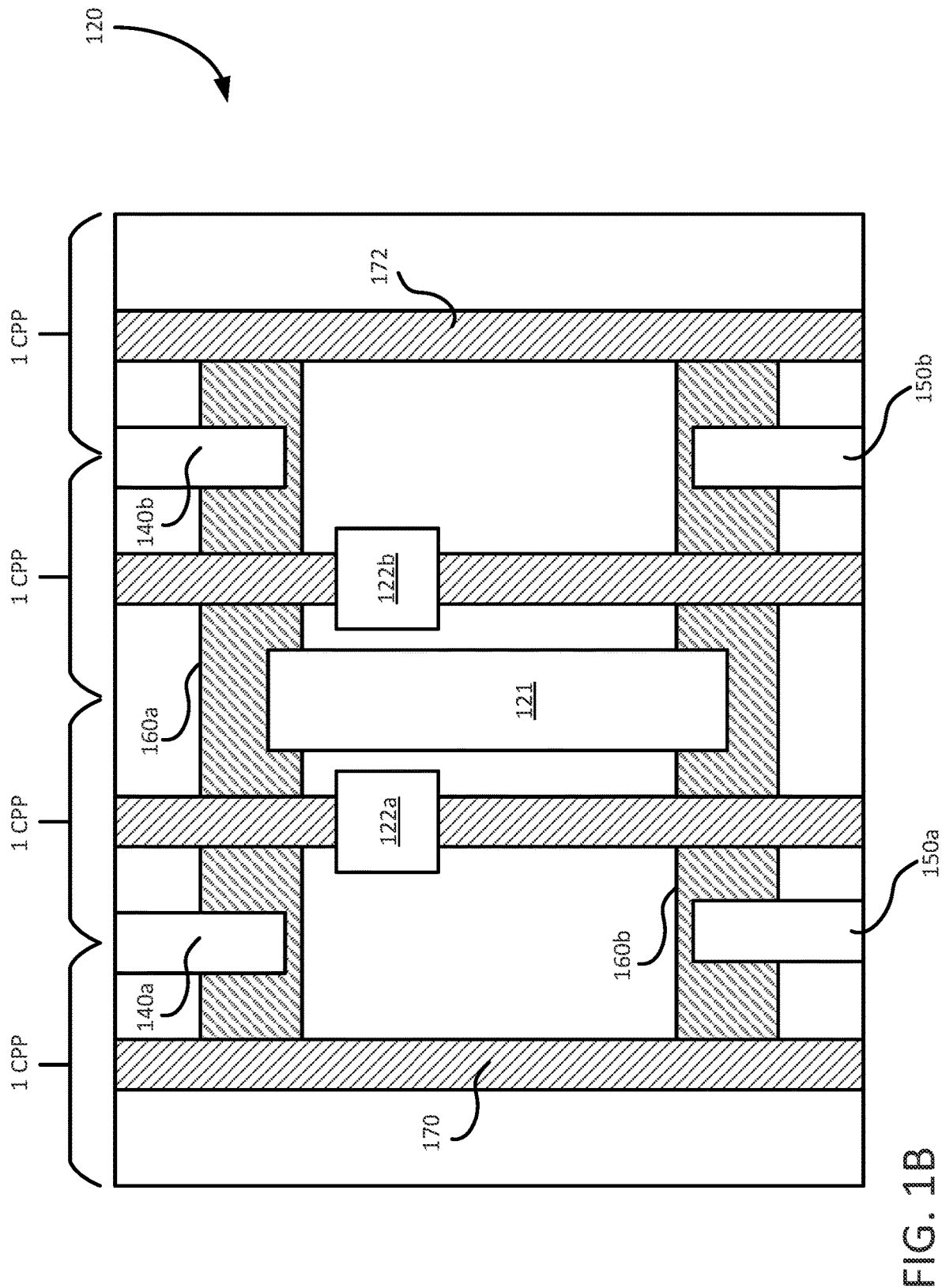

In FIG. 1A, a first single-bit cell 110 provides a NAND function output 111 having a first input 112 that is compared against a second input 113, while in FIG. 1B, a second single-bit cell 120 provides an 2X strength inverter function output 121 having two ports 122a and 122b of an input 122 which are connected together at the chip level. Each of the function outputs 111, 121 in the single-bit cells 110, 120 receive the drive voltage at connections 140a, 140b (VDD) from a power rail 160a. Additionally, the NAND function output 111 has a ground connection 150 (VSS) to the ground rail 160b, and the inverter function output 121 has ground connections 150a, 150b (VSS) to the ground rail 160b. The first single-bit cell 110 and the second single-bit cell 120 are bounded by ground connections 170 and power connections 172. Although the ground connection 170 provides the left cell boundary and the power connection 172 provides the right cell boundary, the ground connection 170 may alternatively provide the right cell boundary while the power connection 172 provides the left cell boundary. Both the first single-bit cell 110 and the second single-bit cell 120 occupy an area that is each 4 contacted poly pitch (CPP) wide for a total width of at least 8 CPP (plus any inter-cell spacing requirements set by a user) for the two individual single bit cells 110, 120. In various embodiment, the size of a CPP may vary based on the fabrication technique used, but the benefits of poly-bit cells can be applied across multiple different fabrication techniques and cell sizes.

Figure 1C:
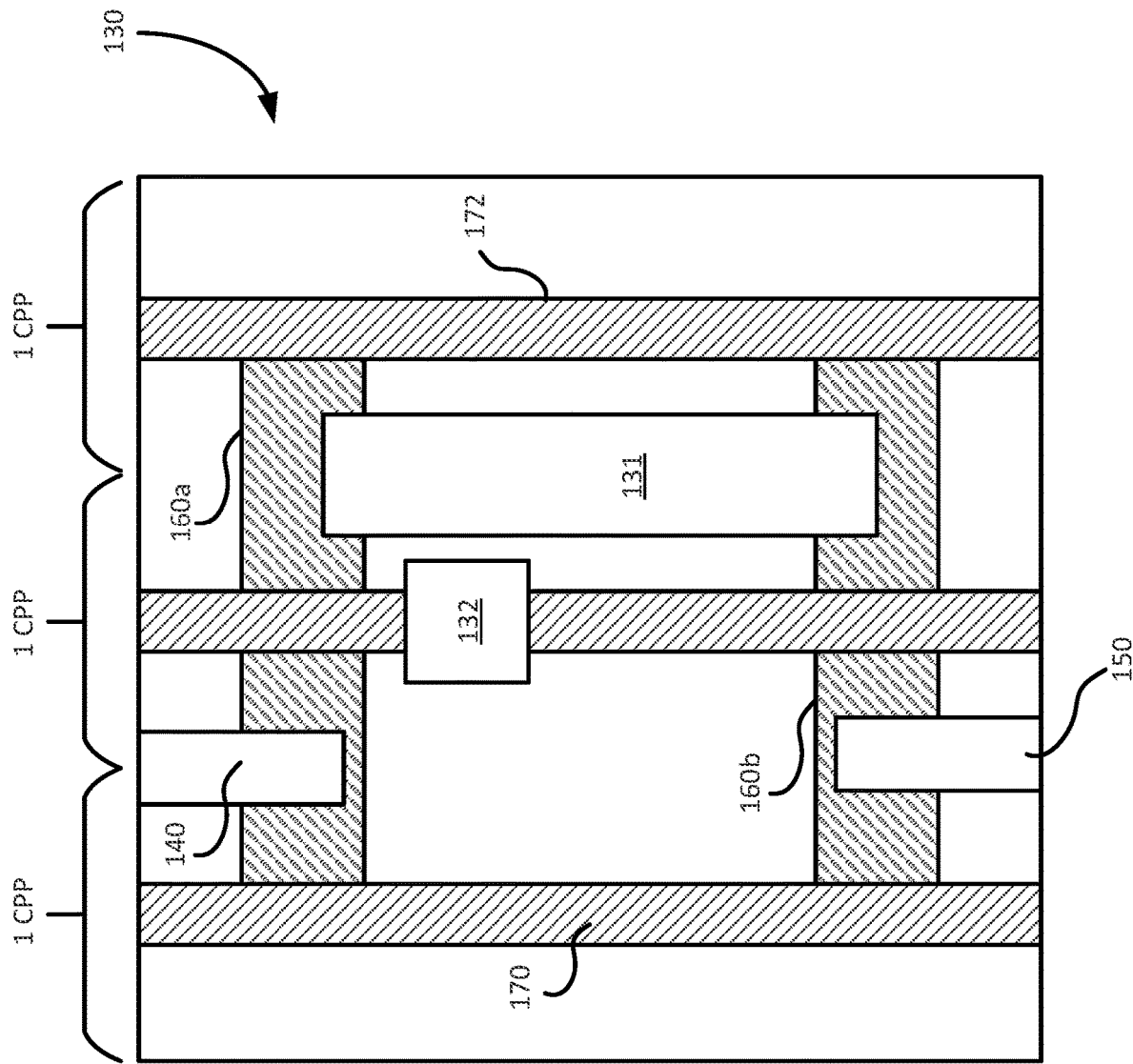

FIG. 1C illustrates a third single-bit cell 130 that provides 1× strength drive inverter function output 131 (in contrast to the 2× strength inverter output 121 of FIG. 1B) having one input 122. The function output 131 in the third single-bit cell 130 receives a drive voltage at one connection 140 (VDD) from a power rail 160a and is connected to one ground connection 150 (VSS) at a ground rail 160b. The third single-bit cell 130 occupies an area that is 3 CPP wide. The total area occupied by the third single-bit cell 130 and one of the first single-bit cell 110 or the second single-bit cell 120 would be at least 7 CPP (plus any inter-cell spacing requirements set by a user) for the two individual single bit cells 130 and 110/120.

In FIGS. 2A, 2B, 2C, and 2D, variations of the NAND function output 111 and the inverter function outputs 121, 131 described in FIGS. 1A, 1B, and 1C are implemented in one cell: a PB cell. The PB cells are IC devices that each include a power rail 160a and a ground rail 160b that the logical functions from two single-bit cells share. By sharing power/ground rails, a PB cell can merge several different types of single-bit cells into one cell including different functions using an equivalent drive strength, different functions using different drive strengths, and multiple instance on one function using different drive strengths. Further, PB cells may include more than two functions. Normally, a PB cell may be constructed whenever the PB cell is smaller in area than the component cells, where the component cells are either normal single function cells or smaller PB cells implementing a subset of the functions.

Figure 2A:
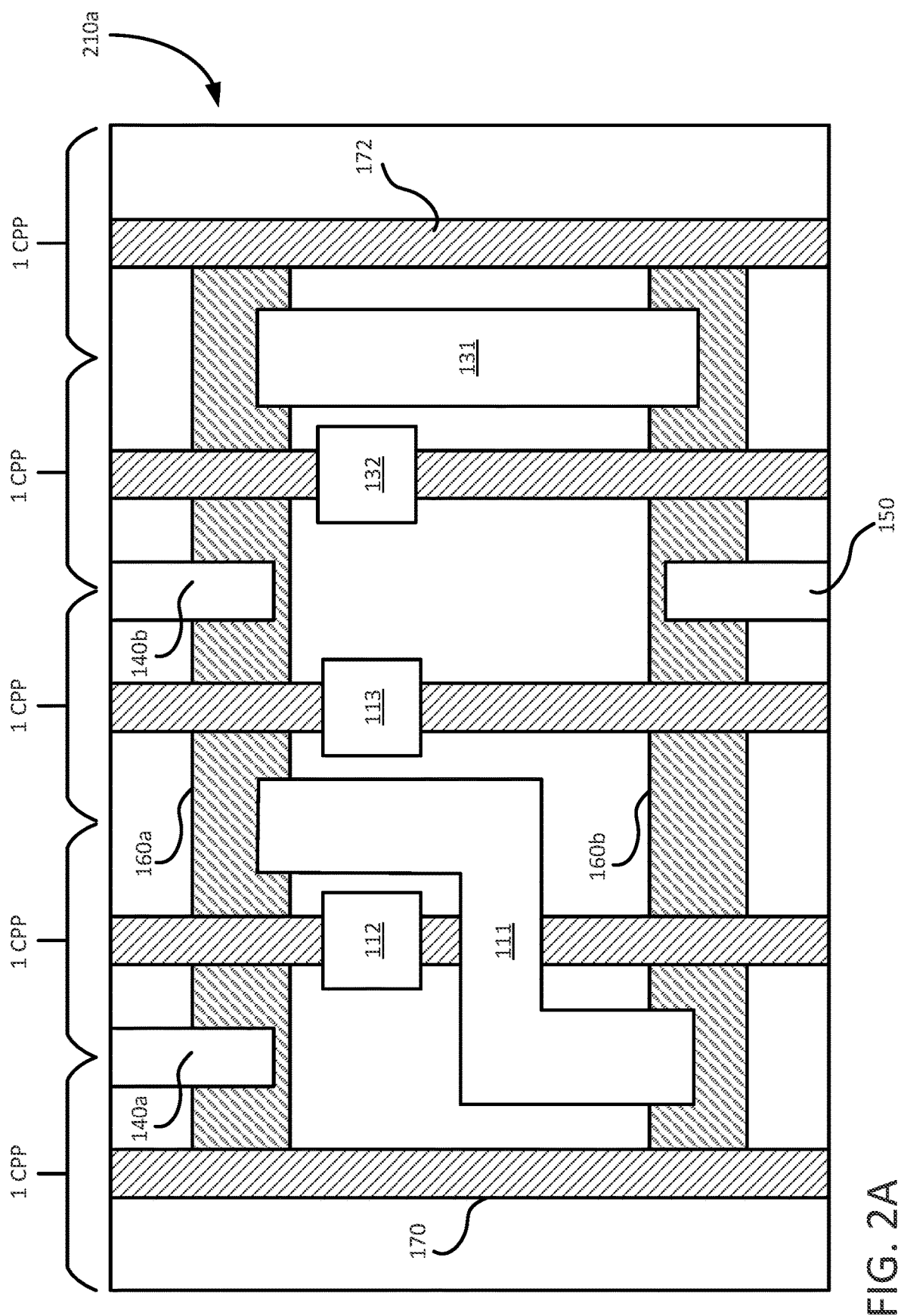
FIGS. 2A, 2B, 2C, and 2D illustrate poly-bit cells formed from the merger of two single-bit cells, according to embodiments of the present disclosure.

In FIG. 2A, a first PB cell 210a provides two instances of the drive voltage connection 140a, 140b (VDD) to drive the functions, but at 1× drive strength rather than 2× drive strength as in FIGS. 1A and 1B. Each of the functions outputs 111, 131 is connected between shared drive voltage connections (VDD) and ground connections (VSS). The first PB cell 210a provides the NAND function with output 111 with the first input 112 and the second input 113, and the inverter function output 131 with one instance of the input 132. The resulting combined first PB cell 210a occupies an area that is 5 CPP wide; less than the total width of 7 CPP wide for the two component single-bit cells 110, 130, and provides two different functions in a single cell.

Figure 2B:
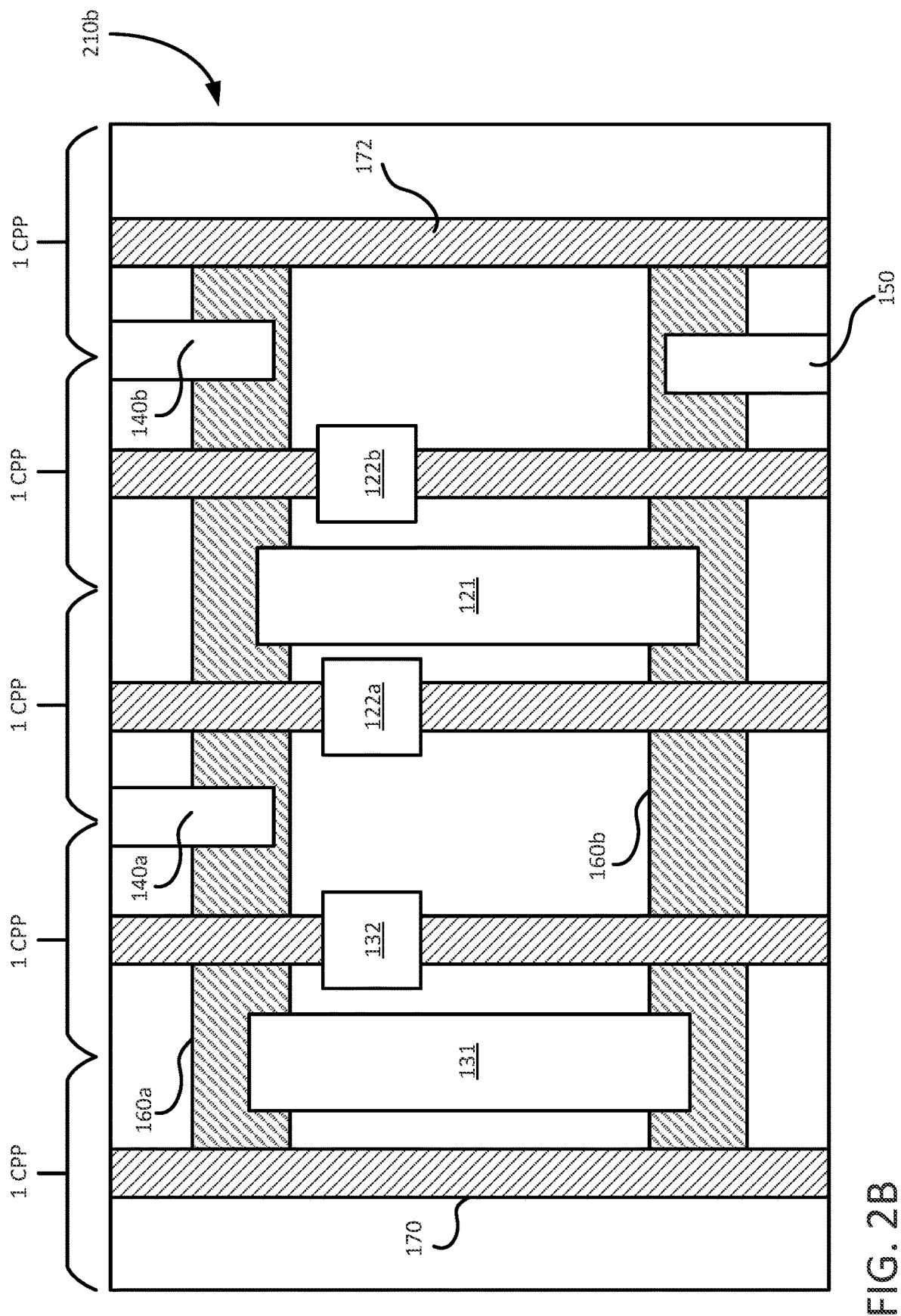

In FIG. 2B, a second PB cell 210b provides two instances of the drive voltage connection 140a, 140b (VDD) to the functions, and includes an inverter function output 131 of 1× drive strength, and an inverter function output 121 of 2× drive strength. The two instances of an inverter functions are both disposed between drive voltage connections (VDD) and ground connections (VSS). The second PB cell 210b provides the first instance of the 1× strength inverter function output 131 with one instance of an input 132 to invert as an associated output, and provides the second instance of the 2× strength inverter function output 121 with two ports 122a, 122b of an input to invert as an associated output. The resulting combined second PB cell 210b occupies an area that is 5 CPP wide; less than the total width of the two single-bit cells 120 for respective inverter function outputs 121, 131 and provides for the combination of two functions driven at different drive strengths.

Figure 2C:
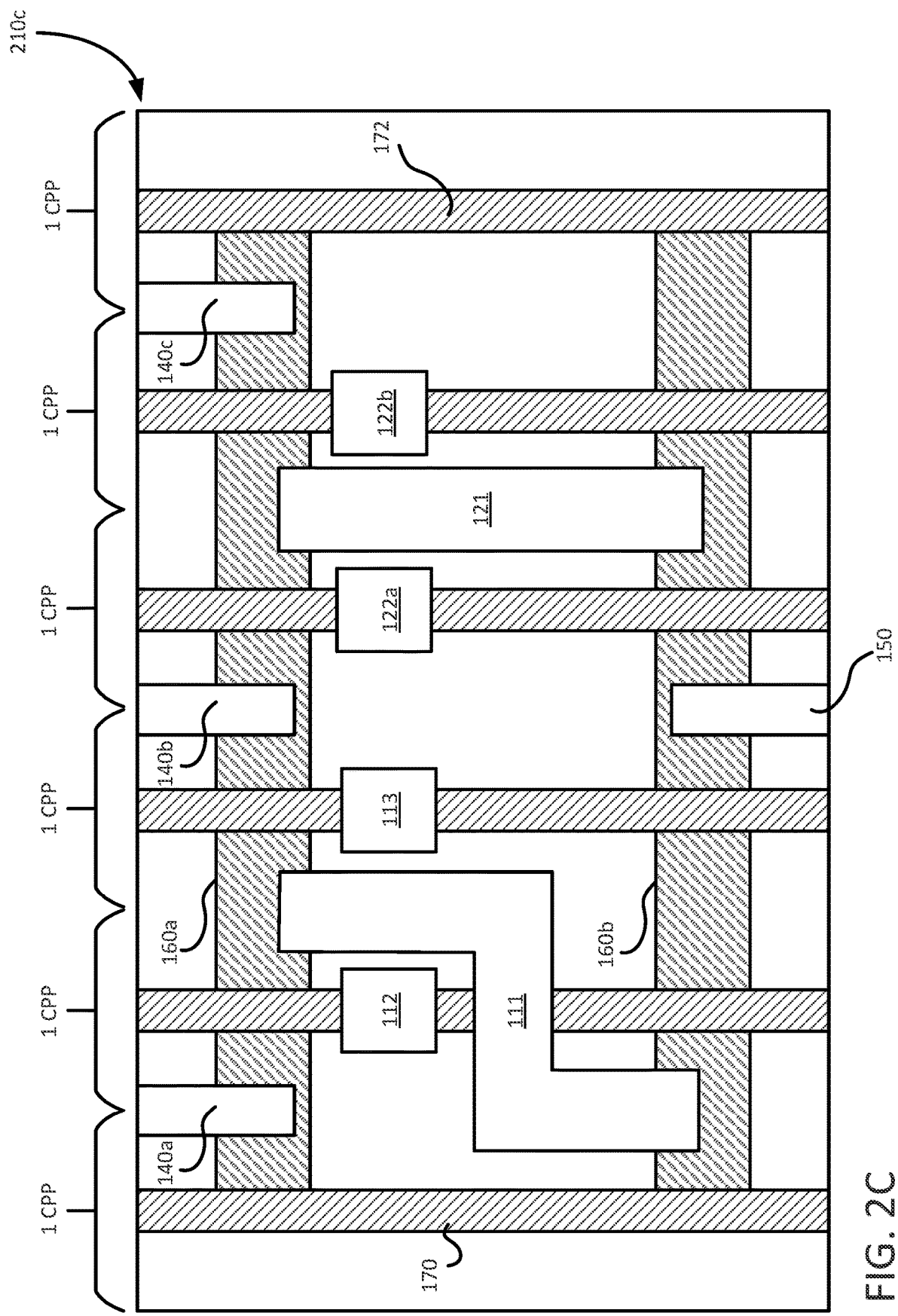
Figure 2D:
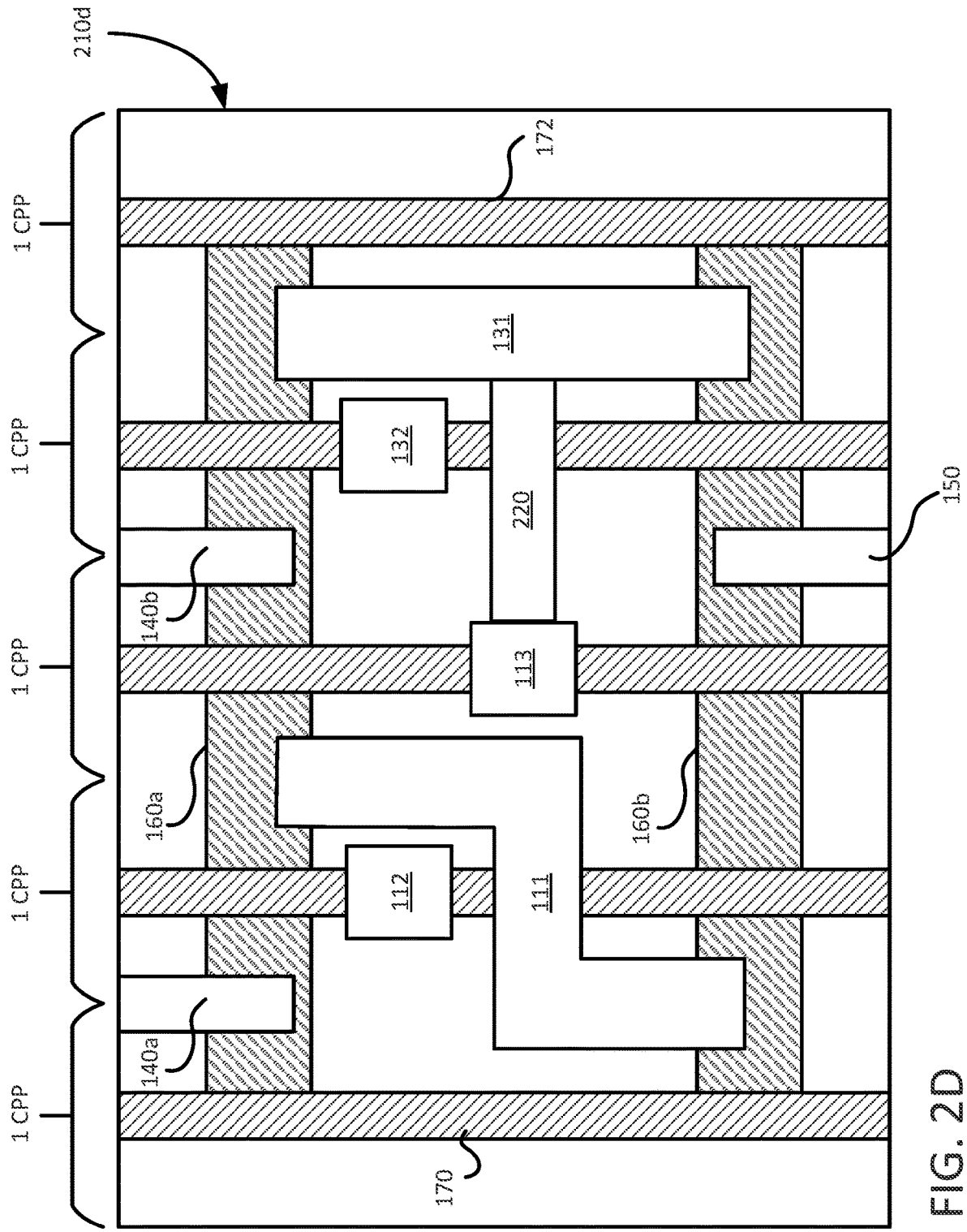

In FIG. 2C, a third PB cell 210c provides three instances of the drive voltage connection 140a, 140b, 140c (VDD) and two instances of the ground connections (VSS) 150a, 150b to drive the functions, and includes a NAND function output 111 and an inverter function output 121 that are each driven at 2x drive strength. The NAND function output 111 and an inverter function output 121 are both disposed between shared drive voltage connections (VDD) and ground connections (VSS). The third PB cell 210c provides the first NAND function output 111 with the first input 112 and the second input 113, and the inverter function output 121 with two ports 122a, 122b of the input 122 which are connected together at the chip level. The resulting combined third PB cell 210c occupies an area that is 6 CPP wide; less than the total width of the two component single-bit cells 110, 120 and provides two different functions in a single cell.

In various embodiments, the outputs of the functions in the PB cells 210 may be connected to the inputs of other functions in the PB cells 210 internally to the PB cell 210. For example, In FIG. 2D, a fourth PB cell 210d provides two instances of the drive voltage connection 140a, 140b (VDD) to drive the functions. Each of the functions' outputs 111, 131 is connected between shared drive voltage connections (VDD) and ground connections (VSS). The fourth PB cell 210d provides the NAND function with output 111 with the first input 112 and the second input 113, and the inverter function output 131 with one instance of the input 132. The second input 113 receives a logical value from the inverter function output 131 via an internal trace 220, while the first input 112 receives a logical value from outside of the fourth PB cell 210d. The resulting combined fourth PB cell 210d occupies an area that is 5 CPP wide; less than the total width of 7 CPP wide for the two component single-bit cells 110, 130, and incorporates a trace 220 that previously occupied space in the design layout between the two functions, thus further saving space in the design layout and reducing trace routing complexity. Stated differently, incorporating the trace 220, which would have been external to and connecting two separate single-bit cells, within the PB cell, no additional space is required for external spaces while enabling the PB cell to have the same functionality at a fraction of the footprint.

Figure 3:
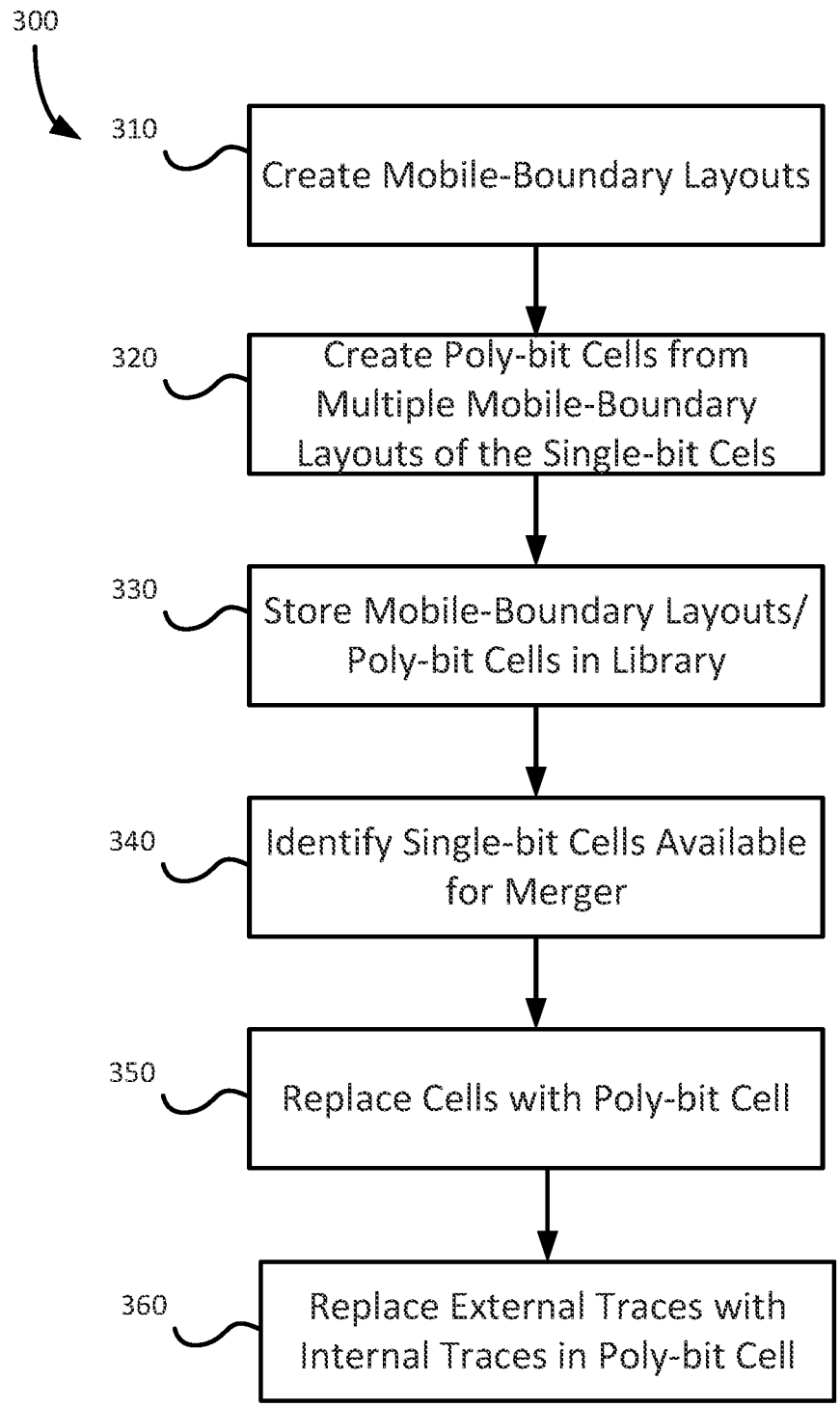
FIG. 3 is a flowchart of a method for providing poly-bit cells, according to embodiments of the present disclosure.

FIG. 3 is a flowchart of a method 300 for constructing PB cells, according to embodiments of the present disclosure. Method 300 begins at 310, where a design system for circuit layout creates mobile-boundary layouts for cells defined in a library. In various embodiments, the design system creates a mobile-boundary layout for every cell in the library, but in other embodiments, the design system may create mobile-boundary layouts for a designated subset of cells or functions. For example, the subset may be limited to the single-bit cells which account for a threshold level of usage in design layouts for a given operator (e.g., used at least X times, the top Y most-used functions, etc.) which reduces the number of cells from with the poly-bit cells may be constructed and keeps the number of potential poly-bit cells from becoming too expansive. The threshold level of usage may be selected by a user, the design system, or be set at a predetermined value. In an example having a threshold of X, only mobile-boundary layouts are only made for cells that are utilized X number of times. In another example having a threshold of Y, only mobile-boundary layouts are only made for cells that are the top Y most used functions. The mobile-boundary layouts are arrangements of circuit elements in which the power and ground connecters can be moved to the left or right of the cell boundary. Once a cell has been identified as having a mobile-boundary layout, the identified cell is reconfigured to have the power and ground connecters relocated to the left and right of the cell boundary to define a mobile-boundary cell. The resulting set of mobile-boundary cells are stored back into the library as $Set_A$. $Set_A$ includes at least a first single-bit cell and a second single-bit cell, wherein at least one of a functionality or drive of the first single-bit cell is different than a functionality or drive of the second single-bit cell. $Set_A$ may also include cells that do not have a mobile-boundary layout, but share the same power and ground connecter location as the mobile-boundary cells comprising $Set_A$.

At 320, the design system creates poly-bit cells from multiple mobile-boundary layouts corresponding to the single-bit cells in $set_A$. Each poly-bit cell includes at least a first single-bit cell and a second single-bit cell from the single-bit cells of $Set_A$ having the mobile-boundary layouts. At least one of a functionality or drive of the first single-bit cell is different than a functionality or drive of the second single-bit cell. The design system merges the power and ground connection of each selected member of $set_A$ to create a new multi-bit PB cell that merges two or more single bit cells. Each PB cell includes at least two members of $set_A$ that share the respective power rail 160a and ground rail 160b. In various embodiments, the design system may create combinations with up to a threshold number of single-bit cells. For example, when the threshold number is two, the design system creates 2-Bit PB cells that combine pairs of single-bit cells. In another example, when the threshold number is three, the design system creates 2-Bit PB cells that combine pairs of single-bit cells, and 3-bit cells that combine three single-bit cells.

The resulting PB cell implements two or more independent functions from the constituent cells, and for a single diffusion break style layout, is typically one CPP narrower than when the two functions are two independent cells. In addition to the area savings offered by PB cells, sharing of the power rails 160a and ground rails 160b merges the diffusions in the constituent single-bit cells, which may improve the performance up to ~4%. Additionally, when external traces between the individual functions are identified, those traces may be included as internal traces within a PB cell, thus further saving space in the layout and reducing trace routing complexity.

At 330, the design system saves these PB cells to a library for later use when corresponding single-bit cells are identified in a design layout for replacement by a given PB cell.

Once the PB cells are saved to the library, the design system at 340 identifies single-bit cells in a design layout available for merger into PB cells (e.g., cells that can share sub-circuits in the design layout). For example, a 2-input inverting multiplexer (MUXI2) and a 2-input non-inverting multiplexer (MUX2) can share a common enable buffer. Multiple PB cells of two, three, and four bits can be created where the drive strength (e.g., 1×, 2×, and 3×) and the function (e.g., MUX2, MUXI2) of each bit in the PB cell were chosen independently. The design system therefore can select a PB cell from the library that has constituent cells of the functions currently deployed as single-bit cells, and replace those single-bit cells in the layout with a corresponding PB cell, per 350. The corresponding PB cell replaces the individual single-bit cells in the layout, and reduces the amount of space occupied by the functions in the layout. The resulting PB cell may include two or more functions with the same or different drive strengths and the same or different operations.

At 360, the design system replaces external traces with internal traces in the poly-bit cell, when possible. The design system checks for whether the individual single-bit cells replaced by a poly-bit cell per 350 were linked via any external traces, and in response may remove the external trace from the circuit layout and create an internal trace 220 within the poly-bit cell to link the two functions. For example, when a first single-bit cell provides an output that is connected to an input of a second single-bit cell, the external trace can be moved within the poly-bit cell along with the functions of those single-bit cells. Accordingly, the design system can further save space in the design layout and reduce routing complexity by internalizing traces between the functions merged within the poly-bit cell.

Figure 4:
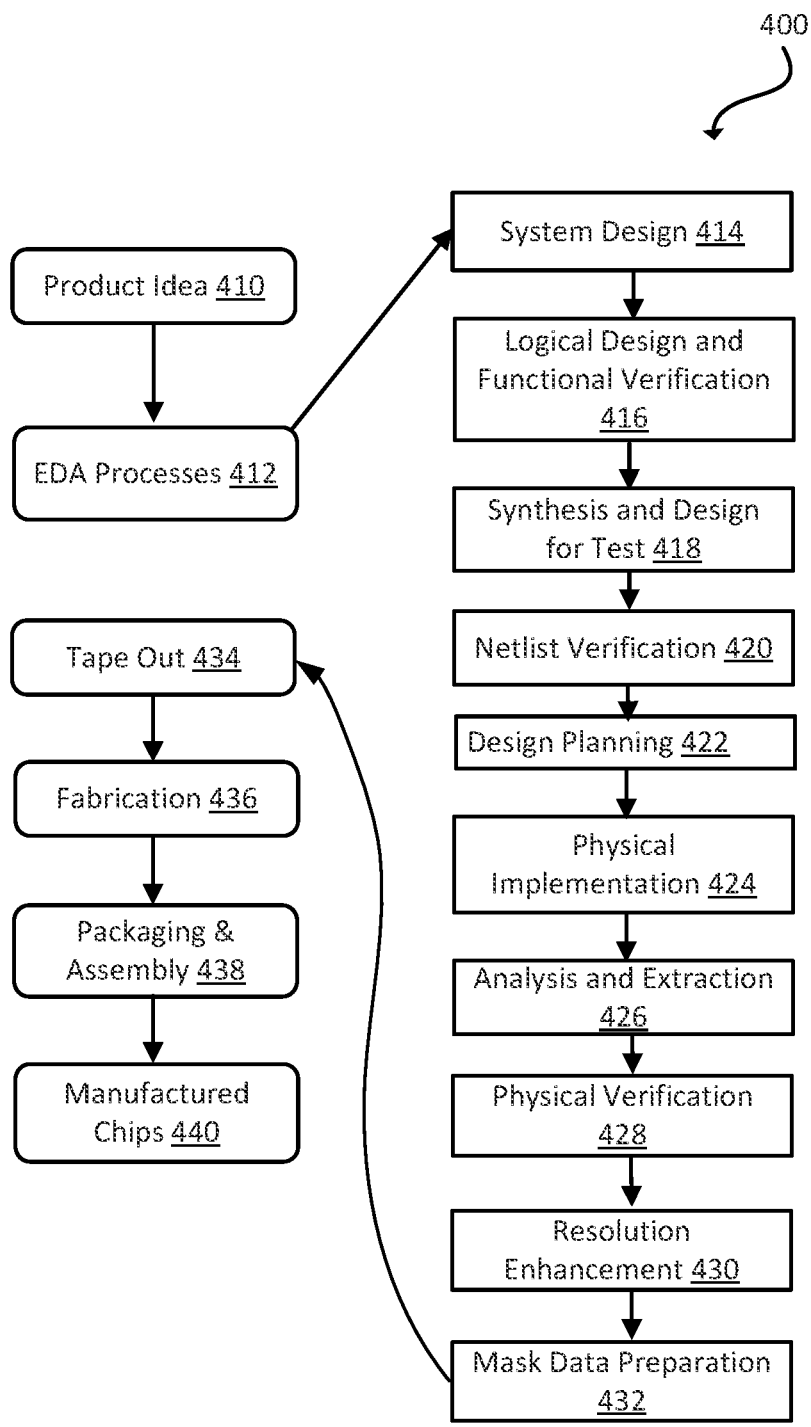
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 4. The processes described by be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
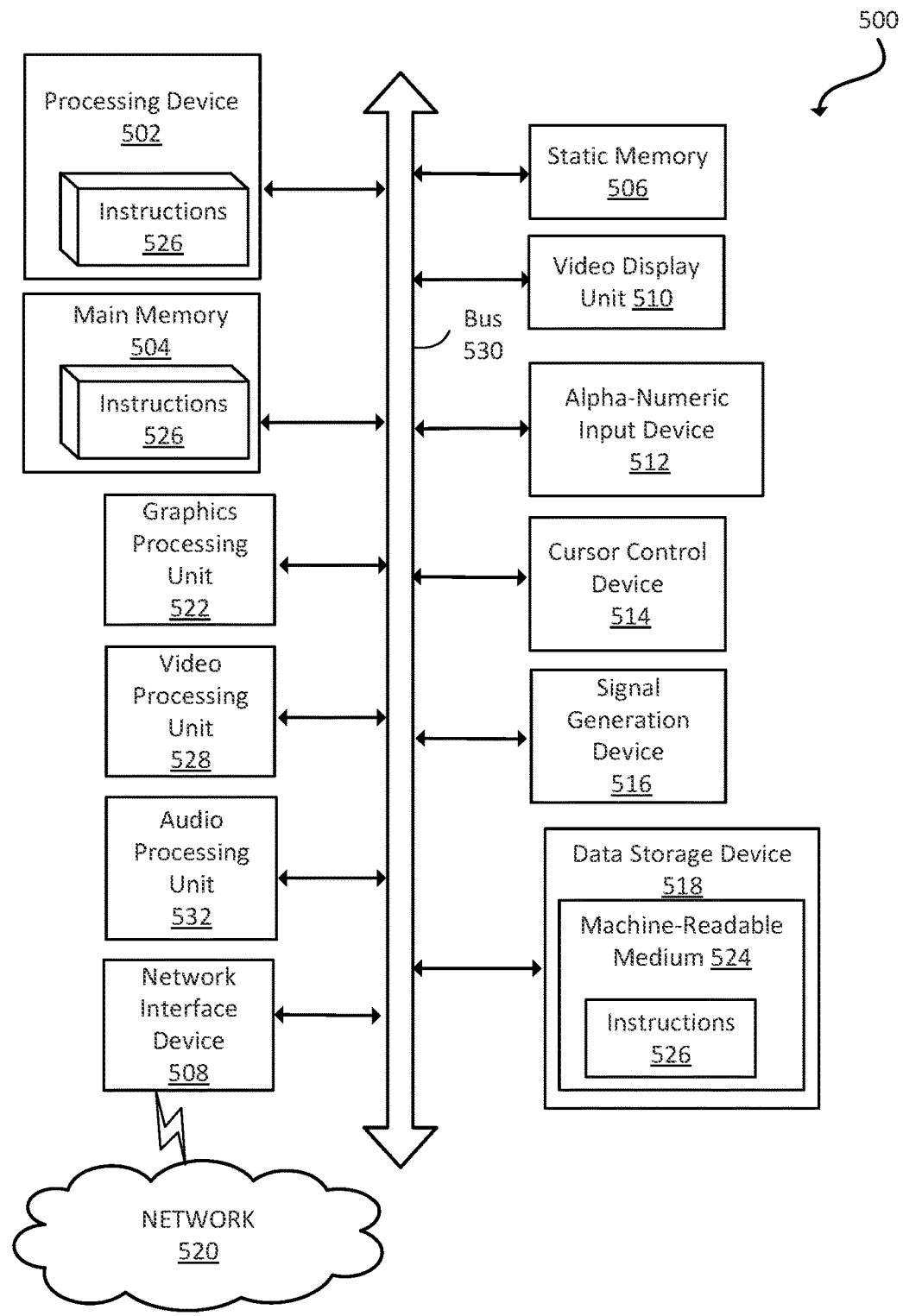
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium comprising stored instructions, which when executed by a processor, cause the processor to:
   construct mobile-boundary layouts of first and second standard cells, wherein the mobile-boundary layouts comprise arrangements of circuit elements in which power supply connectors are moveable within boundaries of the respective mobile-boundary layouts;
   merge the mobile-boundary layouts to provide a merged cell to perform functions of the first and second standard cells with drive strengths of the respective first and second standard cells.

2. The non-transitory computer readable medium of claim 1, wherein the instructions, when executed, further cause the processor to:
   identify the first and second standard cells in a circuit design layout; and
   replace the first and second standard cells of the circuit design layout with the merged cell.

3. The non-transitory computer readable medium of claim 2, wherein:
   the first and second standard cells comprise single-bit standard cells; and
   the merged cell comprises a multi-bit cell.

4. The non-transitory computer readable medium of claim 1, wherein the instructions, when executed, further cause the processor to:
   merge the power supply connectors of the mobile-boundary layouts.

5. The non-transitory computer readable medium of claim 1, wherein the instructions, when executed, further cause the processor to:
   merge diffusion regions of the first and second standard cells in the merged cell.

6. The non-transitory computer readable medium of claim 1, wherein the instructions, when executed, further cause the processor to:
   select the first and second standard cells for construction of the mobile-boundary layouts based on measures of usage of the first and second standard cells in circuit design layouts and a usage threshold.

7. The non-transitory computer readable medium of claim 1, wherein:
   the first standard cell encompasses a first number of polygates,
   the second standard cell encompasses a second number of polygates, and
   the merged cell encompasses a third number of polygates that is less than a sum of the first and second numbers of polygates.

8. The non-transitory computer readable medium of claim 1, wherein the functions of the first and second standard cells differ from one another.

9. The non-transitory computer readable medium of claim 1, wherein the drive strengths of the first and second standard cells differ from one another.

10. The non-transitory computer readable medium of claim 1, wherein the functions of the first and second standard cells differ from one another, and wherein the drive strengths of the first and second standard cells differ from one another.

11. An integrated circuit device, comprising:
    a multi-bit circuit, comprising:
      a power connection;
      a ground connection;
      a first single-bit circuit connected between the power connection and the ground connection; and
      a second single-bit circuit connected between the power connection and the ground connection,
      wherein the first and second single-bit circuits differ from one another with respect to one or more of functionality and driving power or operation,
      wherein the first and second single-bit circuits encompass a first number of polygates when implemented as separate single-bit circuits, and
      wherein the multi-bit circuit encompasses a second number of polygates that is less than the first number of polygates.

12. The integrated circuit device of claim 11, wherein the functions and drive strengths of the first and second standard cells differ from one another.

13. The integrated circuit device of claim 11, wherein the functions of the first and second standard cells differ from one another.

14. The integrated circuit device of claim 11, wherein the drive strengths of the first and second standard cells differ from one another.

15. The integrated circuit device of claim 11, wherein the first single-bit circuit occupies a first contacted poly pitch (CPP) width when implemented as a first single-bit cell in a layout, wherein the second single-bit circuit occupies a second CPP width when implemented as a second single-bit cell in the layout, wherein the multi-bit circuit occupies a third CPP width in the layout less than a combined width of the first CPP width and the second CPP width.

16. A method, comprising:
    identifying first and second standard cells of a circuit design layout that are combinable based on mobile-boundary layouts of the first and second standard cells, wherein the mobile-boundary layouts comprise arrangements of circuit elements in which power supply connecters are moveable within boundaries of the respective mobile-boundary layouts
    merging the mobile-boundary layouts to provide a merged cell to perform the perform functions of the first and second standard cells with drive strengths of the respective first and second standard cells; and
    replacing the first and second standard cells of the circuit design layout with the merged cell.

17. The method of claim 16, wherein the functions of the first and second standard cells differ from one another.

18. The method of claim 16, wherein the drive strengths of the first and second standard cells differ from one another.

19. The method of claim 16, wherein the functions and drive strengths of the first and second standard cells differ from one another.

20. The method of claim 16, further comprising:
    identifying an external trace of the circuit design layout, between an output of the first standard cell and an input of the second standard cell; and
    replacing the external trace of the circuit design layout with an internal trace of the merged cell.

* * * * *